United States Patent [19]

Hall

[11] 4,339,880
[45] * Jul. 20, 1982

[54] DEVICE FOR HOLDING SURVEYOR'S INSTRUMENT

[75] Inventor: George W. Hall, Sioux City, Iowa

[73] Assignee: Beverly J. Hall, Sioux City, Iowa; a part interest

[ * ] Notice: The portion of the term of this patent subsequent to Mar. 11, 1997, has been disclaimed.

[21] Appl. No.: 97,193

[22] Filed: Nov. 26, 1979

Related U.S. Application Data

[63] Continuation-in-part of Ser. No. 953,704, Oct. 23, 1978, Pat. No. 4,192,076.

[51] Int. Cl.$^3$ ............................................. G01C 15/08
[52] U.S. Cl. ................................. 33/293; 248/163 R
[58] Field of Search ................. 33/161, 290, 291, 292, 33/293, 294, 295, 296, 299; 248/163, 165, 431

[56] References Cited

U.S. PATENT DOCUMENTS

| | | | |
|---|---|---|---|
| 1,272,069 | 7/1918 | McMillan | 33/293 |
| 2,058,998 | 10/1936 | Koulichkov | 33/296 |
| 2,245,901 | 6/1941 | Chaskin | 33/295 |
| 2,780,869 | 2/1957 | Long | 33/293 |
| 2,835,975 | 5/1958 | Zimmerman | 33/296 |
| 2,843,347 | 7/1958 | King | 33/293 |
| 3,517,445 | 6/1970 | Harris | 33/292 |
| 3,972,622 | 8/1976 | Mason et al. | 33/293 |
| 4,192,076 | 3/1980 | Hall | 33/296 |

FOREIGN PATENT DOCUMENTS

| | | | |
|---|---|---|---|
| 381133 | 9/1923 | Fed. Rep. of Germany | 33/290 |
| 5945 | of 1908 | United Kingdom | 33/290 |

Primary Examiner—John W. Shepperd
Attorney, Agent, or Firm—Zarley, McKee, Thomte, Voorhees & Sease

[57] ABSTRACT

The device of the present invention comprises a tripod having a platform at its top and three legs pivotally connected at their upper ends to the platform member and diverging downwardly and outwardly therefrom. Three connecting members interconnect the lower ends of the tripod legs. A stake holding means is provided on the tripod and includes an upper bracket connected to the tripod platform and a lower bracket connected to one of the connecting members. The upper and lower brackets each have an opening therein, and the openings of the two brackets are vertically registered for receiving a surveyor's stake. A range pole adapter is adjustably mounted on the upper end of the surveyor's stake and is adapted to hold the surveyor's prism or other instrument.

9 Claims, 14 Drawing Figures

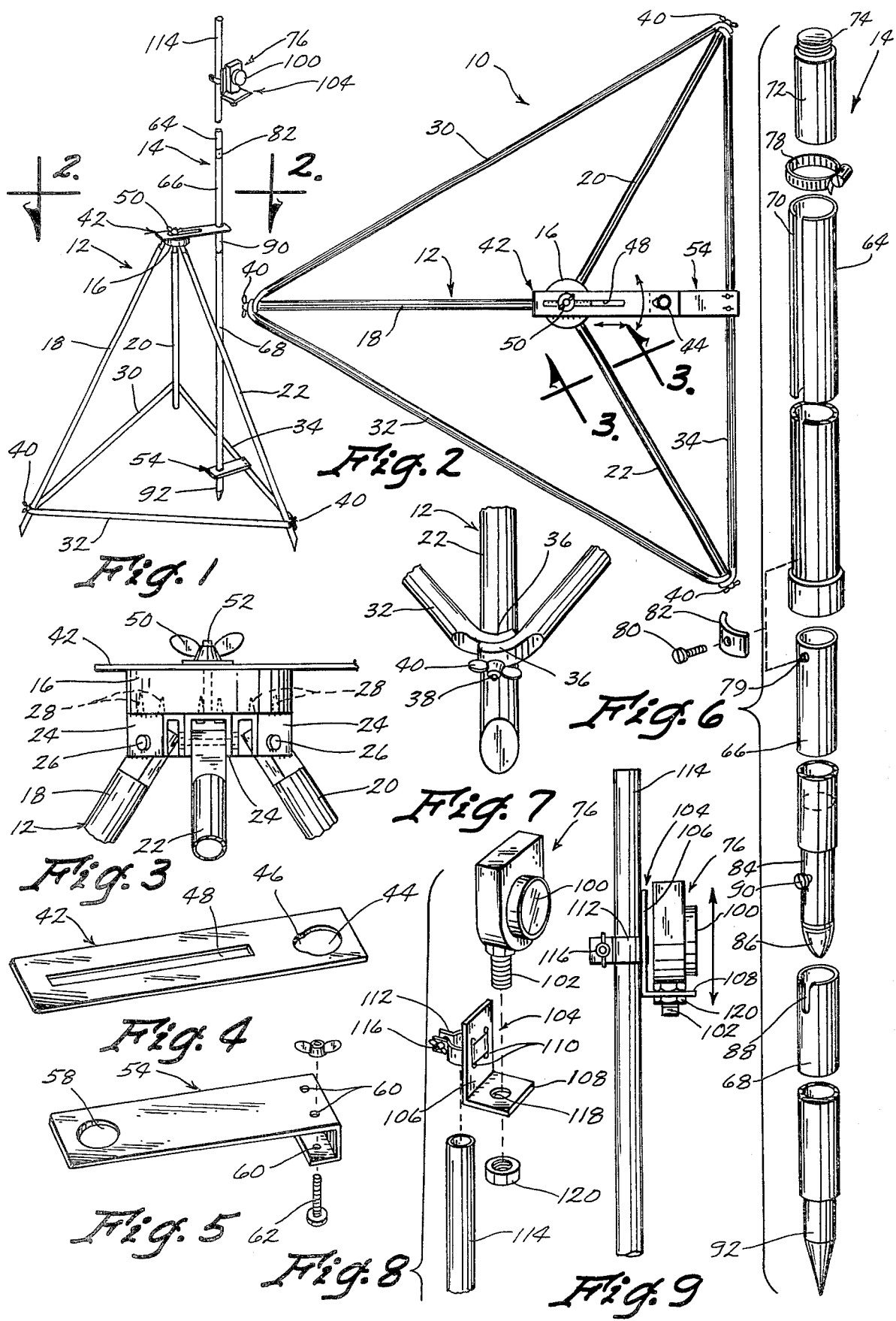

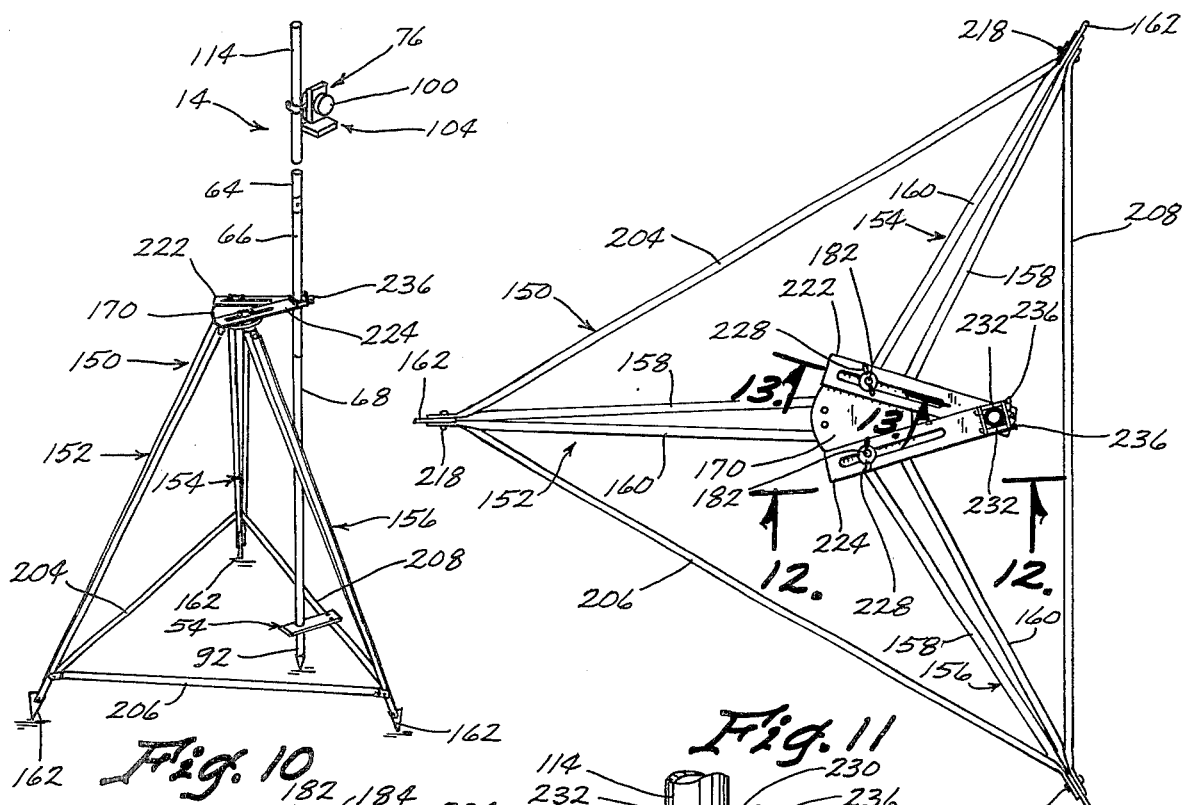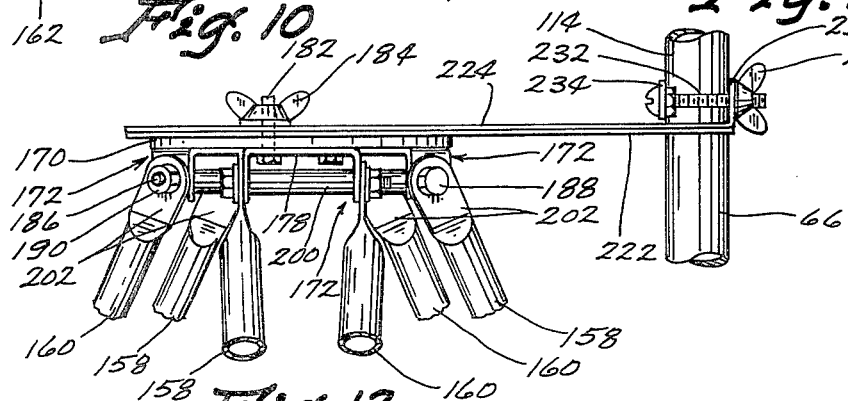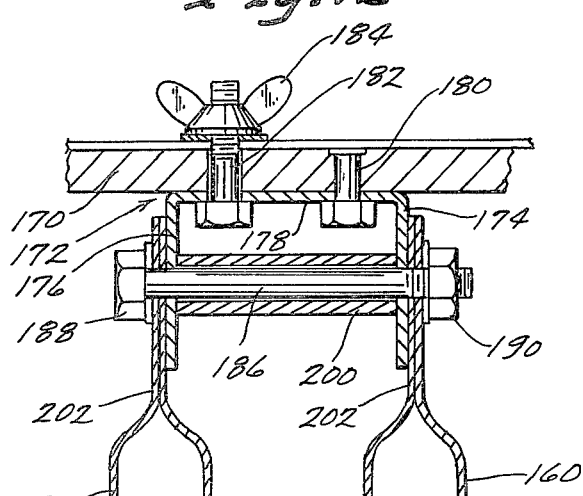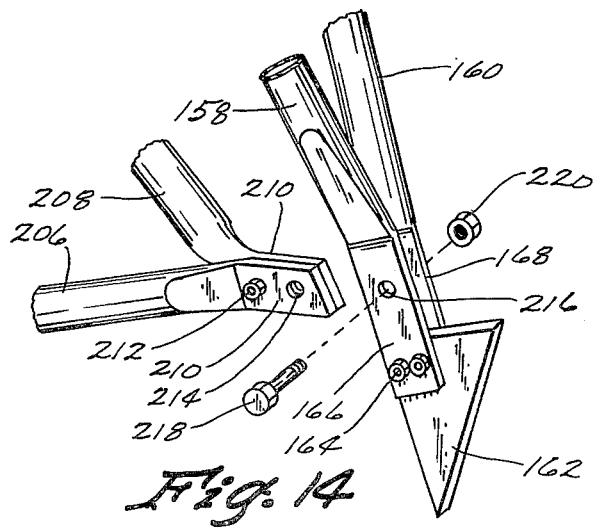

DEVICE FOR HOLDING SURVEYOR'S INSTRUMENT

BACKGROUND OF THE INVENTION

This is a continuation-in-part application of my copending application, Ser. No. 953,704 filed Oct. 23, 1978 now U.S. Pat. No. 4,192,016.

This invention relates to surveying equipment, and specifically to a device for holding a surveyor's range pole or instrument.

Present surveyor's equipment includes electronic sighting devices which are aimed at a target instrument such as a prism positioned some distance away. The target instrument is usually placed on the upper end of a surveyor's stake or range pole and is capable of receiving a signal from the sighting instrument and directing a signal back to the sighting instrument.

When using the above types of surveying equipment, it becomes very important that the surveyor's range pole or stake be accurately positioned, and that it be held in a stationary position during the takings of the various sightings.

Various holding devices have been used for holding the surveyor's stake or pole, but many of these devices are unstable and fall over easily. They often fall over in response to wind or in response to being bumped or jostled.

Surveying equipment is often used on busy highways where much traffic is encountered, and often the instruments are bumped or jostled or run over by vehicles. Therefore, it is desirable that these holding devices be constructed of materials which can easily be repaired or replaced with a minimum of expense.

It is also desirable to have an adjustable adapter for attaching the prism to the range pole so that the prism may be selectively moved upwardly and downwardly on the range pole.

SUMMARY OF THE INVENTION

The present invention utilizes a tripod which includes a plurality of connecting members which are detachably secured and which interconnect the lower ends of the tripod legs. The resulting configuration is a tetrahedran. The connecting members greatly enhance the stability of the device.

Brackets are also provided on the tripod for holding a surveyor's stake or pole in a vertical position. The brackets include an upper bracket connected to the platform and a lower bracket connected to one of the connecting members. The two brackets each include an opening therein which is sized to receive the surveyor's stake. The two openings of the two brackets are vertically registered so as to receive the stake.

An adapter is slidably mounted on the range pole for adjustable vertical sliding movement. It includes means for attaching a prism thereon so as to mount the prism on the range pole.

Therefore, a primary object of the present invention is the provision of an improved device for holding a surveyor's instrument.

A further object of the present invention is the provision of a device for holding a surveyor's instrument which has improved stability over prior art devices.

A further object of the present invention is the provision of a device for holding a surveyor's instrument which holds the tripod legs in a stationary position and prevents them from moving with respect to one another.

A further object of the present invention is the provision of a device for holding a surveyor's instrument which keeps the center of gravity of the combined tripod and surveyor's stake radially inwardly from the leg ends of the tripod.

A further object of the present invention is the provision of a device for holding a surveyor's instrument which includes brackets for gripping the surveyor's stake at two spaced apart vertical points.

A further object of the present invention is the provision of a device for holding a surveyor's instrument which is easily adjustable so as to permit the plumbing of the surveyor's stake.

A further object of the present invention is the provision of a device for holding a surveyor's instrument which is light and easy to transport.

A further object of the present invention is the provision of a device for holding a surveyor's instrument which is easy to disassemble and repair.

A further object of the present invention is the provision of a surveyor's instrument which includes a surveyor's pole which can be easily and quickly expanded to varying lengths.

A further object of the present invention is the provision of an adapter which permits adjustable mounting of a prism on the range pole.

A further object of the present invention is the provision of a device for holding a surveyor's instrument which is economical to manufacture, durable in use, and efficient in operation.

BRIEF DESCRIPTION OF FIGURES OF DRAWINGS

FIG. 1 is a perspective view of the present invention.

FIG. 2 is a top plan view taken along line 2—2 of FIG. 1.

FIG. 3 is a sectional view taken along line 3—3 of FIG. 2.

FIG. 4 is a perspective view of the upper bracket used in the present invention.

FIG. 5 is a perspective view of the lower bracket used in the present invention.

FIG. 6 is an exploded perspective view of the expandable pole used with the present invention.

FIG. 7 is an enlarged detail view of the junction between two connecting members and one of the tripod legs.

FIG. 8 is a perspective exploded view of the upper end of a range pole having an adapter for adjustably mounting a prism thereon.

FIG. 9 is a side elevational view of the device shown in FIG. 8.

FIG. 10 is a perspective view of a modified form of the present invention.

FIG. 11 is a top plan view of the device shown in FIG. 10.

FIG. 12 is a sectional view taken along line 12—12 of FIG. 11.

FIG. 13 is a sectional view taken along line 13—13 of FIG. 11.

FIG. 14 is a detailed perspective view of the lower end of one of the tripod legs of the device shown in FIG. 10.

DETAILED DESCRIPTION OF THE PREFERRED EMBODIMENT

Referring to the drawings, the numeral 10 generally designates the holding device of the present invention. Device 10 includes a tripod 12 and a surveyor's pole or stake 14.

Tripod 12 comprises a platform 16 having three legs 18, 20 and 22 extending downwardly and diverging outwardly therefrom. Each leg is hinged to platform 16 by means of a U-shaped bracket 24 (FIG. 3) having a hinge bolt 26 pivotally connecting the upper end of one of the legs 18, 20 22, to U-shaped bracket 24. Brackets 24 are operatively secured to the undersurface of platform 16 by means of screws 28. The pivotal connection of legs 18, 20 and 22 to brackets 24 permits the legs to swing radially outwardly from platform 16, and permits the legs to be swung radially inwardly for folding for carrying.

Interconnecting the lower ends of legs 18, 20, 22 are three connecting members 30, 32, 34. Each connecting member is of tube-like construction and includes opposite flattened ends 36 which include apertures therein for receiving a bolt 38 which extends through each of the lower ends of legs 18, 20 and 22. A wing nut 40 is threaded over bolt 38 at each of the lower ends of legs 18, 20 and 22 so as to secure the opposite ends of connecting members 30, 32 and 34 therebetween. The connecting members can easily be removed by loosening wing nut 40 and slipping the flattened ends 36 off of the bolt 38.

An upper mounting bracket 42 (FIG. 4) is constructed of plate like material and includes at one end a circular opening 44 having a lobe 46 adjacent one side thereof. At the other end of bracket 42 is an elongated slot 48 which extends along the longitudinal centerline of bracket 42.

Bracket 42 is mounted to platform 16 by means of a wing nut 50 and a bolt 52 which extends through slot 48. The position of bracket 42 with respect to platform 16 may be adjusted radially by loosening wing nut 50 and sliding bracket 42 radially away from the vertical centerline of the tripod. Slot 48 permits this radial movement, and also permits pivotal movement about bolt 52 for circumferential adjustment of opening 44.

A lower mounting bracket 54 is shown in FIG. 5 and includes a hook portion 56 at one end and a circular opening 58 at the other end. Hook portion 56 is sized to fit over one of the connecting members 30, 32, 34 in the manner shown in FIGS. 1 and 2. A pair of bolt holes 60 are provided in J-shaped hook portion 56 and are adapted to register in corresponding holes located at the approximate midpoint of connecting members 30, 32, 34 for receiving bolts 62, and thereby securing bracket 54 to the connecting member.

Upper bracket 42 is adjusted to be in a position wherein circular opening 44 is in registered alignment above circular opening 58 of lower bracket 54. Slidably inserted through registered openings 44, 58 is the surveyor's pole or stake 14 which is shown in greater detail in FIG. 6. Pole 14 is comprised generally of three tubular sections 64, 66 and 68. Tube section 64 includes an elongated slot 70 extending along the length thereof. Telescopically received within the upper end of tube section 64 is a stub shaft 72 having a threaded end 74 for receiving a surveyor's instrument 76 (FIG. 1) thereon. A ring clamp 78 embraces the upper end of tube section 64 and is tightened to cause tube section 64 to clamp tightly around the lower end of stub shaft 72, thereby connecting stub shaft 72 to tube section 64.

Tube section 66 is telescopically received within tube section 64, and includes a bolt receiving hole 79 which is aligned with slot 74 of tube section 64. A bolt 80 extends through a clamp 82 and thence through slot 70 into threaded engagement with bolt hole 79. By tightening bolt 80 it is possible to prevent telescopic expansion and retraction of members 64, 66 with respect to one another. Loosening of bolt 80 permits telescopic expansion or retraction of these two members to the desired length.

The lower end of tube section 66 includes a pin 84 which is riveted or otherwise secured therein. Pin 84 includes a sharpened lower point 86 which can be forced into the ground if desired. If a longer extension of tube 14 is required, tube section 68 can be slidably fitted over pin 84. A slot 88 in tube section 68 is registered with a bolt in pin 84 and tightening of bolt 90 secures two tube sections 66, 68 together. A pin 92 similar to pin 84 is mounted within the lower end of tube section 68. Lobe 46 of opening 44 accommodates the head of screw 90 so as to permit stake 14 to slide freely through opening 44 of bracket 42.

Referring to FIGS. 7 and 8, a surveyor's instrument 76 is shown having a prism 100 thereon. Instrument 76 includes a threaded shaft 102 extending downwardly therefrom. The construction of such prisms varies from manufacturer to manufacturer, some having the threaded portion 102 protruding from the upper end thereof, and others having the threaded portion 102 protruding from the bottom portion thereof.

An adapter 104 is shown having a L-shaped configuration formed by an upstanding leg 106 and a lower horizontal leg 108. Upstanding leg 106 has a pair of vertical slots 110 which receive a fastening band 112. Band 112 is sized to fit over the upper end 114 of a range pole, and a wing nut 116 extending through fastening band 112 permits manual tightening of the band about upper end 114 so as to provide securement thereto. Instrument 76 is secured to adapter 104 by extending threaded shaft 102 through a hole 118 in horizontal leg 108 and fastening instrument 76 thereto by means of nut 120.

The vertical orientation of prism 100 may be adjusted by loosening wing nut 116 and sliding adapter 104 vertically with respect to upper end 114 of the range pole. When the desired height is achieved, wing nut 116 is again tightened to securely hold instrument 76 against vertical movement.

The device of the present invention is very sturdy inasmuch as pole 14 is held radially inwardly from the outer radial edges of legs 20, 22 and 24. Similarly, the adjustment of pole 14 may be easily accomplished by loosening wing nut 50 and moving upper bracket 42 until pole 14 is in a vertical plumb position. Then wing nut 50 need only be tightened to secure the pole in a fixed position.

The connecting members 30, 32, 34 provide additional stability to the device and the tendency of the device to tip or move in response to wind is minimal. The pole 14 is grasped at two spaced apart points by upper bracket 42 and lower bracket 54, and this provides increased stability for pole 14 during the surveying operation.

The device may be easily folded merely by loosening the wing nuts at the ends of the three legs, removing the connecting members, and folding the legs into a folded position. The legs and connecting members are constructed of tube like conduits and may easily be replaced in the event of bending or damage. The pole may be telescoped to various lengths depending upon the length needed for the particular surveying operation.

The adapter 104 permits simple manual adjustment of the vertical position of prism 100. Also adapter 104 can readily receive prisms of varying configurations and shapes presently commercially available.

Referring to FIGS. 10 through 14, a modified form of device for holding the range pole 14 is designated by the numeral 150. Holding device 150 comprises a tripod formed from three leg assemblies 152, 154, 156, each of which comprise a pair of struts 158, 160. The upper ends of struts 158, 160 are spaced apart and the lower ends are bolted to a triangular plate 162 (FIG. 14) by bolts or rivets 164. Struts 158, 160 are comprised of tube like material, but the lower ends are flattened as designated by the numerals 166, 168 (FIG. 14). Flattened portions 166, 168 are held in spaced apart orientation by virtue of the spacing provided by plate 162.

A circular platform 170 has three inverted U-shaped brackets 172 mounted on its lower surface. Referring to FIG. 13, each U-shaped bracket 172 comprises two downwardly extending legs 174, 176 joined by a web portion 178. Web 178 is attached to platform 170 by a pair of bolts 180, 182. Bolt 180 is a short bolt which does not protrude upwardly from the upper surface of platform 170. Bolt 182 on the other hand, extends upwardly from the upper end of plate 170 and has a wing nut 184 threaded thereon. There are two longer bolts 182 utilized to attach two of the three brackets 172 to platform 170. Thus, two bolts 182 protrude upwardly from the upper surface of platform 170.

Extending between legs 174, 176 of bracket 172 is a horizontal axle bolt 186 having a head 188 on one end and a nut 190 on the other. A spacer sleeve 200 extends over bolt 186 between legs 174, 176. The upper ends of struts 158, 160 include flattened portions 202 which have holes therethrough for receiving bolt 186. Flattened portions 202 are attached to the outer surfaces of legs 174, 176 and are held in position on bolt 186 by head 188 and nut 190, respectively.

The lower ends of leg assemblies 152, 154, 156 are held rigidly with respect to one another by means of three connecting members 204, 206, 208, each of which has flattened portions 210 on its opposite ends. The flattened ends 210 of the three members 204, 206, 208 are joined together by a bolt and nut assembly 212 so that members 204, 206, 208 are secured together in a triangular configuration. Flattened portions 210 also have a second hole 214 therein, and holes 214 of each flattened portion 210 are in registered alignment with one another. The two facing flattened portions 210 have a thickness which permits them to be slidably inserted into the space between flattened portions 166, 168 of struts 158, 160 as shown in FIG. 14. Flattened portions 166, 168 have registered holes 216 which are adapted to be registered with hole 214 of flattened portions 210 for receiving a bolt 218. A nut 220 is threadably mounted over the end of bolt 218 and thus holds the triangular assembly formed by connecting members 204, 206, 208 directly to the bottom ends of leg assemblies 152, 154, 156.

Connecting member 208 has a lower mounting bracket 54 mounted thereon in a fashion similar to that described for the device in FIG. 1. Bracket 54 receives the lower end of range pole 14.

Mounted to the upper surface of platform 170 are a pair of bolt holding brackets 222, 224. Each bracket 222, 224 includes a longitudinal slot 226 therein for receiving one of the bolts 182. A wing nut 228 is threadably secured over the upper end of each bolt 182 and holds brackets 222, 224 in place.

Each bracket 222, 224 has a hole for slidably receiving range pole 114 as is readily shown in FIGS. 11 and 12. The use of two brackets 222, 224 provides slightly greater stability for holding range pole 14 than the singular bracket shown in FIGS. 1-9.

The ends of brackets 222, 224 are slightly different in construction. Bracket 222 is flat and includes a hole for receiving range pole 114. Bracket 224 has an upwardly extending flange 230 at its distal end. Flange 230 includes apertures therein for receiving a pair of spaced apart bolts 232 adapted to fit on opposite sides of range pole 114. A take-up plate 234 also receives bolts 232, 234 so that take up plate 234 and bracket 230 embrace pole 114 therebetween. Wing nuts 236 permit the manual tightening of take-up plate 234 and flange 230 against the opposite sides of range pole 114, so as to permit rotation of range pole 114 after it has been secured in place.

Because the interconnecting members 204, 206, 208 are pre-connected, they provide for faster set-ups of the holding device. The hinge configuration of the legs to the circular platform 170 gives the device stability but damage to the hinge configuration can be repaired or replaced easily by removing bolts 186 and replacing the leg assemblies or struts 158, 160.

The use of a double bracket arrangement provided by brackets 222, 224 provides increased stability to the range pole, and the use of a take-up plate 234 to hold the range pole against rotation also provides an improvement to the device.

Thus, it can be seen that the device accomplishes at least all of its stated objectives.

What is claimed is:

1. A device for holding a surveyor's instrument comprising:
   a tripod having a platform member and three legs hingedly connected at their upper ends to said platform member;
   three connecting members interconnecting said lower ends of said legs, each of said connecting members having one of its ends detachably secured adjacent the lower end of one of said legs and the other of its ends detachably secured adjacent the lower end of another of said legs, whereby said connecting members when so secured to said legs hold said legs against pivotal movement of said legs about their hinged connections to said platform member;
   a vertical range pole having upper and lower ends;
   range pole holding means on said tripod for holding said range pole against movement with respect to said tripod,
   said range pole holding means comprising an upper bracket and a lower bracket, said upper bracket being operatively mounted to said platform and said lower bracket being operatively connected to one of said connecting members,
   a range pole adapter mounted to said upper end of said range pole for vertical sliding movement thereon, said adapter having manually operable securing means thereon for selectively holding said adapter against vertical sliding movement on said range pole;

a surveyor's instrument operably attached to said adapter so as to be carried therewith during said vertical sliding movement of said adapter on said range pole.

2. A device according to claim 1 wherein said adapter comprises an L-shaped member having a vertical upstanding leg and a horizontal leg.

3. A device according to claim 2 wherein said securing means is mounted on said vertical upstanding leg and slidably embraces said upper end of said range pole.

4. A device according to claim 3 wherein second securing means detachably mount said surveyor's instrument to said horizontal leg.

5. A device according to claim 4 wherein said second securing means comprise a hole in said horizontal leg, a threaded shaft on said instrument extending through said hole, and a nut threaded onto said shaft.

6. A device for holding a surveyor's stake comprising:

a tripod having a platform member and three legs hingedly connected at their upper ends to said platform member;

three connecting members interconnecting said lower ends of said legs, each of said connecting members having one of its ends detachably secured adjacent the lower end of one of said legs, and the other of its ends detachably secured adjacent the lower end of another of said legs, whereby said connecting members when so secured to said legs hold said legs against pivotal movement of said legs about their hinged connections to said platform member; and stake holding means on said tripod for holding said stake against movement with respect to said tripod;

said stake holding means comprising an upper bracket and a lower bracket, said upper bracket being operatively mounted to said platform, and said lower bracket being operatively connected to one of said connecting members; and hinge means hingedly securing each of said three legs at their upper ends to said platform member, said legs being detachably connected to said hinge means so as to facilitate replacement of said legs when damaged.

7. A device for holding a surveyor's stake according to claim 6 wherein said upper bracket includes means thereon for retentively grasping said stake to hold said stake against rotational movement, said grasping means comprising a take-up plate and a flange embracing said stake therebetween, and threadable tightening means for tightening the force with which said take-up plate and said bracket embrace said stake.

8. A device for holding a surveyor's stake according to claim 6 wherein a second upper bracket is secured to said platform member and retentively holds said stake against movement with respect to said tripod.

9. A device according to claim 6 wherein each of said legs comprises a pair of struts which are spaced apart adjacent their upper ends and which are secured together adjacent their lower ends, said connecting members being attached to one another prior to their attachment to said lower ends of said legs.

* * * * *